United States Patent Office 3,784,528
Patented Jan. 8, 1974

3,784,528
PREPARATION OF ALKOXYLATED RESINS
Dietrich Pirck, Reinbek, Gundolf Fuchs, Meilsen, and Gerhard Sachse, Hamburg, Germany, assignors to Deutsche Texaco Aktiengesellschaft, Hamburg, Germany
No Drawing. Filed Sept. 28, 1972, Ser. No. 293,279
Claims priority, application West Germany, Oct. 4, 1971, P 21 49 471.3
Int. Cl. C08f 1/11, 15/02, 27/00
U.S. Cl. 260—78.5 T
13 Claims

ABSTRACT OF THE DISCLOSURE

Resin products are prepared by alkoxylation of copolymers of vinyl aromatic hydrocarbons such as styrene, with alpha, beta-unsaturated dicarboxylic acid half esters such as the maleic acid-n-butyl half ester. The thus-formed resin products are useful as lacquer resin components for baking varnishes.

BACKGROUND OF THE INVENTION

Field of the invention

The present invention relates to a process for producing alkoxylated copolymers by means of a dispersion polymerization of vinyl aromatic hydrocarbons with alpha, beta-unsaturated dicarboxylic acid half-esters and subsequent alkoxylation.

Description of the prior art

Processes for producing hydroxyl polymers comprising polymerizing alpha, beta-unsaturated dicarboxylic acids or esters thereof with vinyl compounds and subsequently alkoxylating these polymers are known. However, in none of the known processes does the copolymerization of dicarboxylic acid or its half-esters or hydroxyl esters, which is the only carboxylic acid component in the reaction, with vinyl compounds lead to a non-gelated hydroxyl polymer having a sufficient degree of polymerization and suitable color.

The sequence of operations in the prior art processes may be varied in the following manner:

(a) Sequence 1—Anhydride copolymerization-half-esterification-alkoxylation
(b) Sequence 2—Half-esterification-half-ester copolymerization-alkoxylation
(c) Sequence 3—Half-esterification-alkoxylation-copolymerization.

However, the thus-produced resins are not utilizable or their production in the above manner is technically extremely difficult and therefore uneconomical.

The particular problems of the prior art processes are shown below:

Sequence 1

The copolymerization of maleic acid anhydride and vinyl aromatics, especially styrene, is known as an example for a strictly alternating sequence of monomers in the copolymer. It is further known that the length of the molecular chains is materially influenced by the copolymerization temperature. For the production of the suitable lacquer resins, the $k$-value which is representative of the chain lengths of the polymer, may not exceed a certain level otherwise the final product, the lacquer resin solution, shows a too high viscosity at the required solid material concentration and also a quantitative esterification of the anhydride groups in the copolymer is no longer guaranteed. When aromatic solvents are used in the Sequence 1 method using the prior art techniques, the copolymerization may be conducted as precipitation polymerization even at a temperature of about 125° C. and this temperature can even be increased to 135° C. if saturated hydrocarbons are added, and the precipitating copolymer particles do not stick together; however, at temperatures of about 150° C. which is the preferred temperature range for obtaining the optimum $k$-value copolymer, polymeric smears are produced which cannot be technically processed. In further explanation of the $k$-value, it is a measure of polymer chain lengths and is described in detail in the text of H. Fikentscher "Cellulose-Chemie," 13, 58 (1932).

Sequence 2

In the Sequence 2 method using the prior art techniques, one does not find it difficult to produce maleic acid half-esters from maleic acid anhydride with alcohols, but the process must be operated under strictly controlled conditions in order to keep the residual maleic anhydride content low and prevent diester formation. However, even under carefully controlled polymerization conditions, the maleic acid half-esters show a tendency to undesirably disproportionate into maleic acid and maleic acid diester. Under the condition of the copolymerization reaction of maleic acid half-etser and styrene, maleic acid diesters are essentially unable to enter into the polymeriztaion reaction. This inability not only results in a decrease of copolymer product yield, but the residual monomer content adversely affects the copolymer reaction during alkoxylation and is deleterious when the final product is employed as a lacquer resin or lacquer resin component.

The tendency of the half-esters of alpha, beta-unsaturated dicarboxylic acid to undersirable disproportionate to form free acid and diester under the copolymerization reaction conditions can be obviated to a cetrain degree by initially conducting the reaction as a block polymerization until the formed copolymer has reached a viscosity barring it from processability. A further increase in visocsity is prevented by adding solvent. In addition to the highly complex process technology concerning the reaction heat transfer when the viscosity level is high, the content of residual monomers is undesirably high also with this mode of operation.

Sequence 3

In the third process variation employed in the prior art, it is possible to manufacture beta-hydroxylalkylmaleic half-esters by reacting maleic half-esters with 1,2-epoxides but besides that, high molecular products having a strong tendency towards resinification are formed. One of the undesirable side-reactions is the reaction of hydroxyl monomers with the double bond of maleic acid or its derivatives, respectively. It is to be noted that the reaction of a glycol with the double bond of maleic acid derivatives of various kinds is described in a paper published in "Farbe and Lacke" (Paint and Lacquers), vol. 75, p. 523 (1969). Because of this hydrating etherification as an undesirable side-reaction no more polymerizable low molecular compounds are formed. These compounds have a substantially higher molecular weight than the desired hydroxyl esters so that the latter can be separated by distillation. However, due to thermal stress, even employing careful distillation conditions, the above side reaction is further intensified thus resulting in a considerable loss of desired product yield.

German Offenlegungschrift No. 1,903,194 discloses bead polymerization of vinyl components with maleic acid half-esters in an aqueous medium. But since half-esters tend to be dissolved in the aqueous phase, it is on the one hand difficult to obtain polymers with a vinyl component to maleic acid half-ester mole ratio of 1:1 (this is possible only when employing the maleic acid component in larger excess), and on the other hand loss of product yield takes place.

DETAILED DESCRIPTION OF THE INVENTION

Surprisingly, we have found that the aforementioned difficulties can be overcome by a modification of the above-described Sequence 2 procedure by carrying out the copolymerization of alpha,beta-unsaturated dicarboxylic acid half-esters in gasoline hydrocarbons and in the presence of a dispersing agent.

In specific details the present invention relates to a process for producing a lacquer resin component for baking varnishes by copolymerizing vinyl aromatic hydrocarbons having from 8 to 12 carbon atoms with alpha, beta-unsaturated dicarboxylic acid half-esters in dispersion which is characterized by performing the radical-initiated copolymerization in gasoline hydrocarbons in the presence of a dispersing agent and minor amounts of water and subsequently alkoxylating the obtained copolymer.

The copolymerization of the vinyl aromatic hydrocarbons and said alpha,beta-unsaturated dicarboxylic acid half-esters is conveniently conducted at a mole ratio of about 1:1 and at a temperature of from 60 to 160° C., preferably of from 90 to 120° C. It is necessary that minor amounts of water be present in this reaction mixture, ranging from traces to about 1 weight percent based on the weight of the reaction mixture.

By adding a dispersing agent and conducting the copolymerization in gasoline hydrocarbons according to the invention the copolymer precipitates therefrom in the form of powder or in the form of fine beads. Thus, it is possible on the one hand to prevent the viscosity from strongly increasing as the copolymerization progresses and on the other hand to simulate some sort of mass polymerization by the agglomeration of monomers in and on the precipitating polymer particles achieving a higher reaction of monomers.

The residual monomers may be separated for a large part together with the liquid phase by means of filtration. Then, after dissolution in a solvent and addition of dimethyl formamide and water as catalyst, the solids may be reacted with alkoxide to form hydroxyl resin. A special advantage of the process of the invention is that the reaction with alkoxides may also be effected in suspension without destroying the suspension. Therefore, it is possible to recover the desired hydroxyl resin by means of filtration and, after a simple drying step, a powdered resin is obtained.

Preferred vinyl aromatics used according to the invention include styrene and its nuclear alkylated derivatives such as vinyl toluenes and vinyl xylenes.

Preferred half-esters of alpha,beta-unsaturated dicarboxylic acids are the half-esters obtained by reacting maleic acid, fumaric acid and their alkyl derivatives with aliphatic alcohols having from 3 to 12 carbon atoms, ethers of monoglycols, diglycols, triglycols with alcohols of from 1 to 4 carbon atoms or mixtures of such alcohols.

Suitable catalysts for the radical-initiated copolymerization process of this invention include, for example, organic peroxides such as benzoyl peroxide, tertiary butylhydroperoxide, etc.

The polymerization is performed in gasoline hydrocarbons such as pentane, hexane, isohexane, heptane, octane, isooctane, methyl-cyclohexane, benzene, toluene, and mixtures thereof, and also higher boiling gasolines which are aromatic-free or low in aromatics.

Suitable dispersing agents include all known dispersing agents provided that they are compatible with all components of the reaction system of the invention, for example, surface active agents such as soaps from higher fatty acids with zinc or alkaline earth metals, and/or polymeric types such as polyacrylates and polymethacrylates with long-chain alkyl groups. The preferred dispersing agents are copolymers of (a) Esters of alpha,beta-unsaturated dicarboxylic acid, such as maleic acid, fumaric acid, etc. with aliphatic alcohols of from 10 to 20 carbon atoms, preferably from 12 to 18 carbon atoms, or mixtures of such alcohols and (b) An ethylenically unsaturated compound such as an alpha-olefin having from 2 to 6 carbon atoms as exemplified by propylene, isobutylene, etc.; aromatic vinyl compounds such as styrene, vinyl toluene, etc.

Preferably, the copolymers used as dispersing agents are built up from isobutylene or styrene as the vinyl component and maleic acid anhydride as the dicarboxylic acid. The vinyl component is preferably reacted with the alpha, beta-unsaturated dicarboxylic acid half-ester in a mole ratio of about 1:1. The preferred dispersing agents show a particularly good compatibility wtih the lacquer system of the invention.

In German Offenlegungsschrift No. 1,903,194 mentioned above with respect to producing copolymers of vinyl aromatic hydrocarbon and maleic acid half-ester in an aqueous medium, mixture ratios of styrene to maleic acid half-ester of 1.3 to 2:1 are utilized in the examples. Because styrene is the more active partner in the reaction, yields of as much as 92 to 95 percent are obtained, whereas the polymerization of equimolar amounts yield only 85 percent. Now, our object is to provide a copolymer in which the two monomers are present in a mole ratio of 1:1 and to achieve a nearly quantitative reaction or at least recycle the non-reacted monomers with the gasoline solution. A recycling of maleic acid half-esters from the aqueous phase is practically impossible due to the partial hydrolysis.

It has been found that in order to obtain a copolymer with a monomer mole ratio of 1:1, styrene and maleic and half-ester must be reacted at least in a mole ratio of 1.5:1 if suspended in aqueous phase.

EXAMPLE I

Stage 1

Four hundred and sixteen grams of styrene in which 13 grams of benzoyl peroxide (desensitized with 20 percent of water) were dissolved and 864 grams of maleic acid-1-butoxyethyl half-ester were added over a period of two hours at a temperature of 80° C. to a mixture of 600 grams of hexane, 600 grams of heptane and 40 grams of dispersing agent (i-butylene-maleic acid-$nC_{12-18}$ half-ester copolymer) after which the said mixture was maintained at 80° C. for a further four-hour period. An additional quantity of benzoyl peroxide in the amount of 13 grams (desensitized with 20 percent of water) in 100 grams of gasoline were added to the reaction mixture during the first hour of the post-reaction time. A relatively finely divided solid half-ester copolymer was formed which was easily separated from the liquid phase by means of filtration. After drying 1230 grams of the solid copolymer product, corresponding to 97 percent of theory, having a $k$-value of 28 were obtained (the $k$-value is a measure of the polymer chain length and is described in detail in the text of H. Fikentscher "Cellulosechemie," 13, 58 (1932). The gasoline solution contained 25 grams of maleic acid-2-butoxyethyl half-ester besides minor amounts of styrene and 2-butoxyethanol.

Stage 2

Six hundred grams of the solid copolymer prepared in Stage 1 were dissolved in 600 grams of a mixture of butanol and xylene (1:2) and mixed with 48 grams of a 50 percent aqueous dimethyl formamide solution. Subsequent to heating said mixture to a temperature of from 75 to 80° C., 176 grams of ethylene oxide were added thereto over a period of 45 minutes and the mixture was maintained at this temperature for an additional 5-hour period. The acid number at this time was determined to be 7.5 and the iodine color number of the solution was 5. Excess ethylene oxide was separated by expanding and subsequent purging with an inert gas whereby 80 percent of the ethylene was recovered. The thus-obtained hydroxyl resin may be baked in mixture with 10 parts of melamine resin to give high quality lacquer coatings. Typical lacquer data are shown in Table 1.

EXAMPLE II 114.4 grams (1.1 moles) of styrene in which 2.9 grams of the benzoyl peroxide according to Example I were dissolved and 172 grams of maleic acid-n-butyl half-ester were added over a period of one hour and at a temperature of 120° C. to 300 grams of octane admixed with 10 grams of dispersing agent (styrene-maleic acid-nC$_{12-18}$-half-ester copolymer). The mixture was then maintained for an additional period of four hours at a temperature of 120° C. During the first hour of the post-reaction time an additional quantity of benzoyl peroxide in the amount of 2.9 grams dissolved in 20 grams of octane was added.

methyl formamide and 12 parts of water. Over 30 minutes, 116 grams of propylene oxide were introduced into the thus-obtained mixture.

After the reaction had progressed for six hours at a temperature of from 75 to 85° C., it was interrupted by expanding the excess alkylene oxide.

After filtration and washing, the reaction product was recovered from the dispersion as a free-flowing resin powder. The acid number of the polymeric propoxylate was below 5.

The lacquer resin components obtained according to the present invention can be hardened with melamine resin or polyisocyanate to give high quality lacquer films.

TABLE 1.—TEST DATA FOR WHITE LACQUERS [1] OF EXAMPLES I AND II

| Example | Hardening °C. | Hardening Time | Erichsen deepening, color, mm. | Pendulum hardness, sec. | Mandrel,[2] 4 mm. | Cross-cut adhesion (Gitter-schnitt) | Resistance to premium grade gasoline |
|---|---|---|---|---|---|---|---|
| I | 130 | 30 minutes | 8.7 | 101 | Satisfactory | 1 | Unobjectionable. |
|   | 180 | do | 7.2 | 163 | do | 1 | Do. |
|   | 200 | 10 minutes | 6.7 | 166 | do | 1 | Do. |
| II | 25 | 24 hours | 9 | 90 | do | 0 | Slightly affected. |
|   | 25 | 72 hours | 9 | 163 | do | 0 | Resistant. |
|   | 25 | 168 hours | 8.9 | 174 | do | 1 | Do. |

[1] Pigment ratio, resin:TiO$_2$=k:0.7.
[2] German Industrial Standard Test.

The finely divided half-ester copolymer was separated by filtration and, after drying, yielded 284 grams of solid, corresponding to 98 percent of theory. The k-value was 25. This solid was dissolved in 300 grams of 1:2 mixture of ethylglycol acetate and xylene and was ethoxylated as indicated in Example I down to an acid number of 0.8. This resin solution was admixed with an aliphatic polyisocyanate solid under the trade name of Desmodur N by Farbenfabriken Bayer A.G. of Leverkusen, Germany, in a ratio of 2:1 (ethoxylate:Desmodur N), resulting in lacquer combinations which even at room temperature hardened to lacquer films of excellent quality. Data relating to the thus-prepared lacquer are shown in Table 1.

EXAMPLE III

Comparison with prior art

If one attempted to prepare the product of Stage 1 of Example I without the addition of a dispersing agent, the polymer was obtained as a viscous smear which could not be further processed on a technical scale.

EXAMPLE IV

Comparison with prior art

In another comparative example illustrating the polymerization in solution of the same monomers as employed in Example I, the procedure of Example I was repeated except that instead of 1,300 grams of the hexane-heptane mixture 1,300 grams of a butanol-xylene mixture in the ratio of 1:2 was used. The ethoxylation was carried out as in Stage 2 of Example 1. The thus-obtained resin solution had a dark color and a color number of from 250 to 300. When this resin was mixed with melamine resin and pigmented with titanium oxide up to a pigment volume concentration of 20, the Elrepho values obtained after baking were from −7 to −8. Thus, the resins produced according to Example IV were completely useless for white lacquers, and their use in colored lacquers is strongly liimted.

EXAMPLE V

In this example, Stage 1 of Example I was repeated. However, the polymeric reaction product was not separated but 600 grams of the dispersion were mixed with 24 grams of a catalyst solution consisting of 12 parts of di-

What is claimed is:

1. A process for producing a lacquer resin component for baking varnishes which comprises copolymerizing vinyl aromatic hydrocarbons of from 8 to 12 carbon atoms with alpha, beta-unsaturated dicarboxylic acid half-esters in dispersion, characterized by conducting the radical-initiated copolymerization at a temperature of from about 60 to about 160° C. in gasoline hydrocarbons in the presence of a dispersing agent and minor amounts of water ranging from traces to about 1 weight percent based on the weight of the reaction mixture and subsequently alkoxylating the obtained copolymer.

2. The process according to claim 1 wherein the said vinyl aromatic hydrocarbon is styrene.

3. The process of claim 1 wherein the said half-ester is maleic acid-2-butoxyethyl half-ester.

4. The process of claim 1 wherein the said alkoxylation is conducted by reacting with an alkylene oxide selected from the group consisting of ethylene oxide, propylene oxide, butylene oxide and mixtures thereof with the previously formed copolymer.

5. The process according to claim 1, wherein the said alkoxylation reaction is conducted with an alkylene oxide after adding catalytic amounts of aqueous dimethylformamide solution while maintaining the suspension state.

6. The process according to claim 1, wherein in the copolymerization reaction the mole ratio of vinyl aromatic hydrocarbon to half-ester is about 1:1.

7. The process according to claim 1, wherein the copolymerization is conducted at a temperature of from about 90 to about 120° C., and with a mole ratio of vinyl aromatic hydrocarbon to half-ester of about 1:1.

8. The process according to claim 1 in which the said dispersing agent is a copolymer of (a) esters of alpha, beta-unsaturated dicarboxylic acids with aliphatic alcohols having from 10 to 20 carbon atoms and mixtures of such alcohols with (b) ethylenically unsaturated copolymerizable compounds.

9. The process according to claim 1, wherein the said dispersing agent is a copolymer of maleic acid half-ester and a compound selected from the group consisting of isobutylene and styrene.

10. The process according to claim 1, wherein the said dispersing agent is a copolymer of (a) esters of alpha, beta-unsaturated dicarboxylic acids and a mixture of $C_{12}$ to $C_{18}$ aliphatic alcohols with (b) ethylenically unsaturated copolymerizable compounds.

11. The process according to claim 1, wherein the said dispersing agent is a combination of resinous polymer and a metal soap of a higher fatty acid.

12. The process according to claim 1, wherein the said dispersing agent comprises in combination, (a) a soap selected from the group consisting of zinc soap and an alkaline earth metal soap of a higher fatty acid and mixtures thereof, and (b) polyacrylates and polymethacrylates with long-chain alkyl groups and mixtures thereof.

13. The process according to claim 1, wherein the said half-ester is the half-ester of an alpha, beta-unsaturated dicarboxylic acid and a monoether glycol selected from the group consisting of the monoethers of monoglycols, diglycols, and triglycols with alcohols having from 1 to 4 carbon atoms.

References Cited

UNITED STATES PATENTS

| | | | |
|---|---|---|---|
| 3,646,044 | 2/1972 | Sekmakas | 260—29.6 H |
| 3,247,145 | 4/1966 | Masters et al. | 260—23 |
| 3,483,170 | 12/1969 | Vander Meij | 260—78.5 |
| 3,514,419 | 5/1970 | Darlow et al. | 260—29.6 |
| 3,270,088 | 8/1966 | Hicks | 260—851 |

FOREIGN PATENTS

| | | |
|---|---|---|
| 959,131 | 5/1964 | Great Britain. |

JOSEPH L. SCHOFER, Primary Examiner

J. KIGHT, Assistant Examiner

U.S. Cl. X.R.

260—23 R, P, 29.6 H, RW, 33.6 UA, 78.5 AT, 78.5 R, HC, 851